(12) United States Patent
Djebali

(10) Patent No.: US 10,082,445 B2
(45) Date of Patent: Sep. 25, 2018

(54) METHOD FOR MONITORING THE CHANGE IN STATE OF A VALVE BY MEASURING PRESSURE

(75) Inventor: Karim Djebali, Asnieres sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 672 days.

(21) Appl. No.: 14/003,689

(22) PCT Filed: Mar. 6, 2012

(86) PCT No.: PCT/FR2012/050456
§ 371 (c)(1),
(2), (4) Date: Sep. 6, 2013

(87) PCT Pub. No.: WO2012/120229
PCT Pub. Date: Sep. 13, 2012

(65) Prior Publication Data
US 2013/0340442 A1 Dec. 26, 2013

(30) Foreign Application Priority Data
Mar. 8, 2011 (FR) ..................... 11 51879

(51) Int. Cl.
*F01D 17/08* (2006.01)
*G01M 15/14* (2006.01)
(Continued)

(52) U.S. Cl.
CPC ............ *G01M 15/14* (2013.01); *F01D 17/08* (2013.01); *F01D 19/00* (2013.01); *F02C 7/268* (2013.01);
(Continued)

(58) Field of Classification Search
CPC .... F01D 17/08; F01D 19/00; F05D 2260/301; F05D 2260/85; F05D 2260/309;
(Continued)

(56) References Cited

U.S. PATENT DOCUMENTS 3,059,660 A * 10/1962 Dantowitz ............ F01D 17/26
137/488
3,107,489 A 10/1963 Palfreyman
(Continued)

FOREIGN PATENT DOCUMENTS

WO 96 28644 9/1996

OTHER PUBLICATIONS

International Search Report dated Jun. 18, 2012 in PCT/FR12/050456 Filed Mar. 6, 2012.

*Primary Examiner* — Carlos A Rivera
(74) *Attorney, Agent, or Firm* — Oblon, McClelland, Maier & Neustadt, L.L.P.

(57) ABSTRACT

A method for monitoring the change in state of a valve in a start up circuit of a turbo-engine following a command to change the state of the valve includes measuring the air pressure under a fan cowl of the turbo-engine before the change state command, measuring the air pressure under the fan cowl after the change state command, comparing the measured values of the air pressure, and determining whether or not the valve has actually changed state. An aircraft turbo-engine includes a unit that monitors the change in the valve using such a method.

9 Claims, 3 Drawing Sheets

(51) Int. Cl.
*F01D 19/00* (2006.01)
*F02C 7/268* (2006.01)

(52) U.S. Cl.
CPC .... *F05D 2260/85* (2013.01); *F05D 2270/092* (2013.01); *F05D 2270/301* (2013.01); *F05D 2270/309* (2013.01)

(58) Field of Classification Search
CPC ... F02C 7/268; G01F 1/10; G01F 1/12; G01F 1/125; G01M 15/14
See application file for complete search history.

(56) References Cited

U.S. PATENT DOCUMENTS

| | | | | |
|---|---|---|---|---|
| 3,769,998 | A * | 11/1973 | Avant | F16K 31/365 137/116.5 |
| 4,006,634 | A * | 2/1977 | Billette | G01F 1/42 73/861.53 |
| 4,351,150 | A * | 9/1982 | Schulze | F01D 17/085 60/226.1 |
| 4,702,273 | A | 10/1987 | Allen et al. | |
| 5,463,865 | A | 11/1995 | Smith | |
| 5,581,995 | A | 12/1996 | Lucenko et al. | |
| 2006/0031001 | A1* | 2/2006 | Snowbarger | G05B 5/00 701/114 |

* cited by examiner

METHOD FOR MONITORING THE CHANGE IN STATE OF A VALVE BY MEASURING PRESSURE

DESCRIPTION

Technical Field

This invention discloses a method for monitoring the change in state of a valve in a start up circuit of an aircraft turbo-engine.

The method according to the invention is complementary to monitoring the state of the valve that is already monitored by two separate sensors.

State of Prior Art

The start up circuit of an aircraft turbo-engine is connected to a pressurised air circuit of the aircraft, and is composed mainly of a pneumatic starter that is supplied with pressurised air through a valve.

When it is supplied with pressurised air, the starter drives the aircraft turbine through a gearbox, so that the aircraft can start.

The open or closed position of the valve is monitored through two separate position sensors.

When the two position sensors indicate contradictory information after a change valve state command, in other words one sensor indicates that the valve is in the open position while the other sensor indicates that the valve is in the closed position, it is impossible to know whether or not the valve has actually changed state.

This difference in information displayed by the position sensors is commonly referred to as a "difference failure".

When the difference failure takes place while the aircraft is still on the ground, the pilot is notified by an alert to prevent takeoff.

The aircraft is then inspected to verify if a sensor or the valve is defective.

Such a procedure is satisfactory from the point of view of flight safety, but it is relatively expensive and restrictive for operation of the aircraft.

The purpose of the invention is to disclose a method for monitoring the change in state of the turbo-engine start up valve, to determine whether or not the valve has actually changed state following the change valve state command, independently of information given by the two sensors associated with the valve.

PRESENTATION OF THE INVENTION

The invention discloses a method for monitoring the change in state of a valve in a turbo-engine start up circuit following a command to change the state of said valve, characterised in that it comprises a step to measure the air pressure under the fan cowl of the turbo-engine before said change state command, a step to measure the air pressure under the fan cowl after said change state command, a step to compare the measured values of the air pressure and a step to determine whether or not the valve has actually changed state.

A change in the state of the valve produces a modification to the pressure under the fan cowl of the turbo-engine. Thus, a check to determine whether or not this pressure has changed determines whether or not the valve has changed state.

Preferably, said determination step consists of determining that the valve has changed state when the difference between the value of the air pressure under the fan cowl before the change valve state command and the value of the air pressure under the fan cowl after the change valve state command is greater than or equal to a predetermined threshold volve.

Preferably, said determination step consists of determining that the valve is open after said change valve state command when the value of the air pressure under the fan cowl after the change valve state command is greater than the value of the air pressure under the fan cowl before the change valve state command.

Preferably, said determination step consists of determining that the valve is closed following said change valve state command when the value of the air pressure under the fan cowl after the change valve state command is less than the value of the air pressure under the fan cowl before the change valve state command.

Preferably, said determination step comprises a step to calculate the air pressure gradient under the fan cowl when the change valve state command is given.

Preferably, said determination step consists of determining that the valve has changed state when the absolute value of said gradient is greater than a predetermined threshold value.

Preferably, the start up circuit comprises two sensors of the open or closed position of the valve, and the method is used when information about the state of valve output by one sensor is different from information output by the other sensor.

Preferably, the method comprises a step consisting of determining which of the sensors is defective.

The invention also discloses an aircraft turbo-engine comprising a start up circuit, said start up circuit comprising a pneumatic starter and a starter pressurised air supply valve, characterised in that it comprises means of monitoring the change in the valve using a method as defined above.

Preferably, the turbo-engine comprises means of measuring the air pressure under a turbo-engine fan cowl.

BRIEF DESCRIPTION OF THE DRAWINGS

Other characteristics and advantages of the invention will become clear after reading the detailed description given below which will be better understood by referring to the appended drawings among which.

DETAILED PRESENTATION OF PARTICULAR EMBODIMENTS

Figure 1:
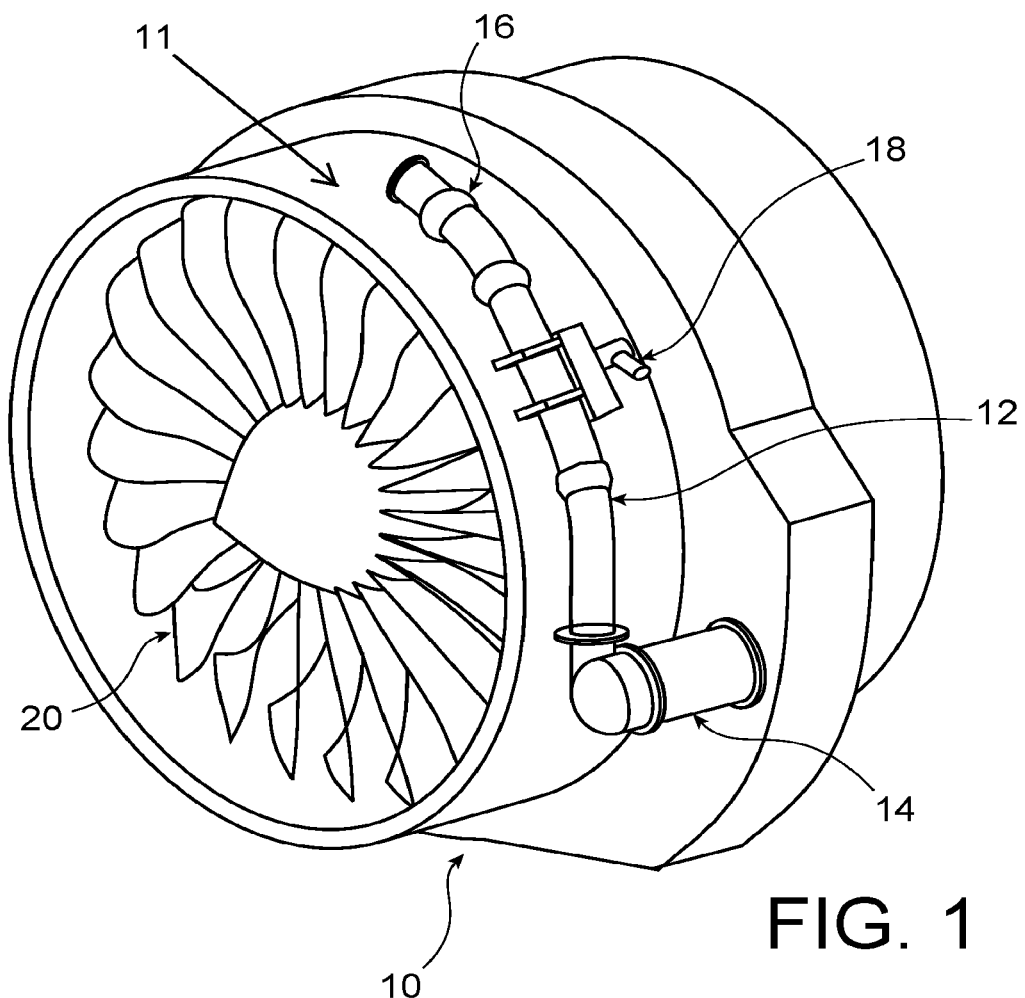
FIG. 1 is a diagrammatic perspective view of an aircraft turbo-engine showing the pneumatic start up circuit of the turbo-engine.

FIG. 1 shows a start up circuit 12 for an aircraft turbo-engine 10.

The start up circuit 12 comprises in particular a pneumatic type starter 14 that is supplied with pressurised air through a conduit 16 connected to a supply device (not shown).

The conduit 16 comprises a valve 18 called the start up valve that may or may not close the conduit 16, which then allows pressurised air to drive the starter 14.

During a start up phase of the turbo-engine 10, an electronic control device (not shown) sends a change state command or a change position command to the valve 18 so that the valve opens.

Opening of the valve 18 enables pressurised air to circulate in the conduit 16 to drive the starter 14.

The starter 14 then drives the mobile parts 20 of the turbo-engine 10 in rotation until the speed of the turbo-engine 10 is sufficient for start up to take place.

When the turbo-engine 10 has been started, the electronic control device sends a change state command to the valve 18 so that the valve 18 closes.

The valve 18 then closes the conduit 16, such that the starter 14 is no longer driven by pressurised air.

The state of the valve 18, in other words if it is in the open or closed position, is monitored through two sensors (not shown) that monitor the position of the valve 18.

Figure 2:
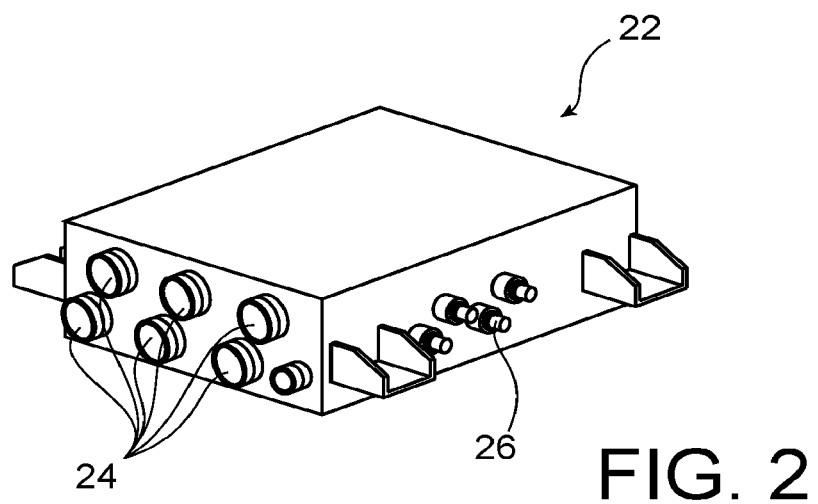
FIG. 2 is a diagrammatic view of the electronic computer of the turbo-engine.

These two sensors are connected to a computer 22 shown in FIG. 2.

The computer 22 is installed on the turbo-engine 10 and it is located below a fan cowl 11 of the turbo-engine 10.

The computer 22 comprises sensor connectors 24 and sensors 26 to measure ambient conditions under the fan cowl 11, particularly the air pressure.

Figure 3:
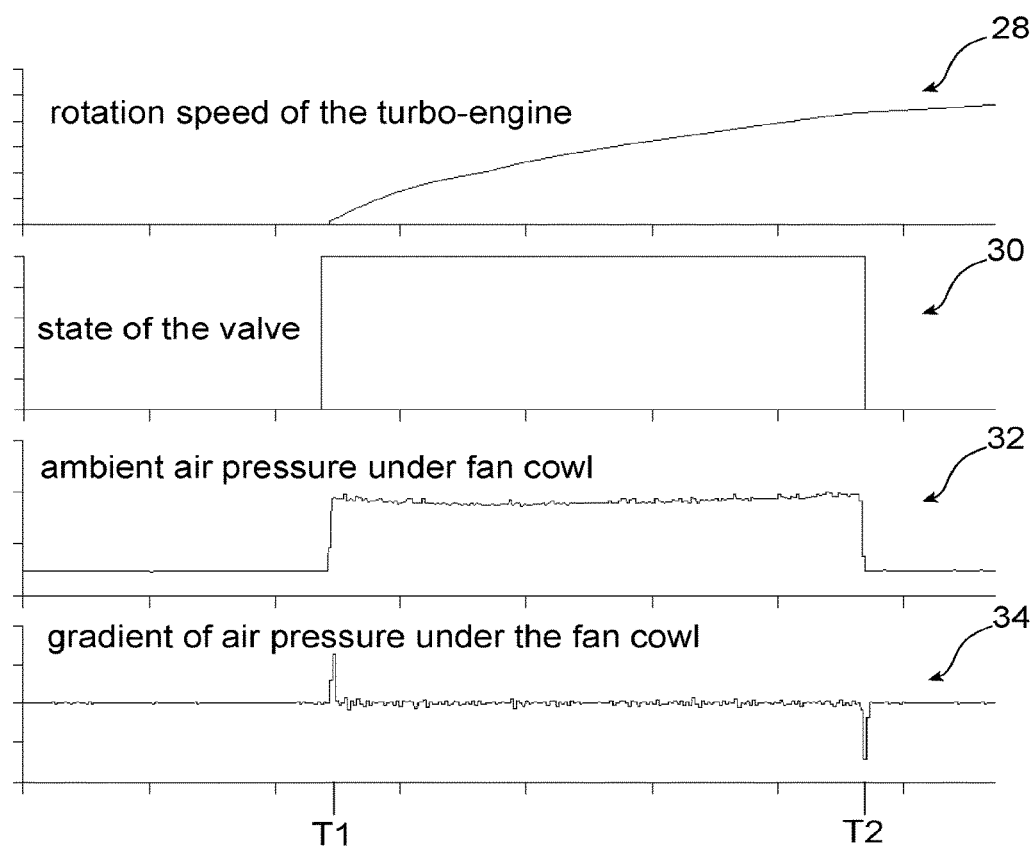
FIG. 3 is a set of curves showing the variations in the turbo-engine speed, the position of the start up circuit valve, the pressure at the fan cowl and the pressure gradient at the fan cowl when the aircraft is on the ground.

FIG. 3 shows several curves representing operating conditions of the turbo-engine 10 when starting up on the ground.

The first curve 28 corresponds to the rotation speed of the turbo-engine 10.

The second curve 30 corresponds to the state of the valve 18, the value 0 (zero) corresponds to the closed position of the valve 18, the value 1 (one) corresponds to the open position of the valve 18.

The third curve 32 corresponds to the ambient air pressure under the fan cowl 11 measured by the sensors 26 of the computer 22.

The fourth curve 34 corresponds to the gradient of the air pressure measured by the sensors 26 of the computer 22, in other words the rate of change of the air pressure under the fan cowl 11.

At time T1 corresponding to the beginning of a start up phase of the turbo-engine 10, an open command is sent to open valve 18, in other words a change valve state command to change valve 18 from the closed position (value 0 on the second curve 30) to the open position (value 1).

The rotating parts 20 of the turbo-engine 10 are then driven in rotation by the starter 14 so that the speed of the turbo-engine 10 progressively increases as can be seen on curve 28.

When the valve 18 is open, leakage flows particularly in the starter 14, cause an increase in the ambient air pressure under the fan cowl 11.

Sensors 26 of the computer 22 are capable of measuring the pressure under the fan cowl 11, they are therefore capable of measuring the pressure variation under the fan cowl 11.

Thus, as can be seen on the third and fourth curves 32, 34, the pressure under the fan cowl 11 increases significantly at time T1, the pressure gradient is positive and its absolute value is relatively high.

When the turbo-engine 10 is started up, a close valve command to close valve 18 is sent at time T2 so that the valve changes state from the open position (value 1) to the closed position (value 0).

The turbo-engine rotation speed shown on the first curve 28 continues to increase independently of the start up circuit 12 due to the energy produced in the combustion chamber.

Since the valve 18 is closed, leakage flows stop so that there is no longer any increase in the air pressure under the fan cowl.

The air pressure under the fan cowl reduces significantly as can be seen in curves 32 and 34, the pressure gradient is then negative and its absolute value is relatively high.

Figure 4:
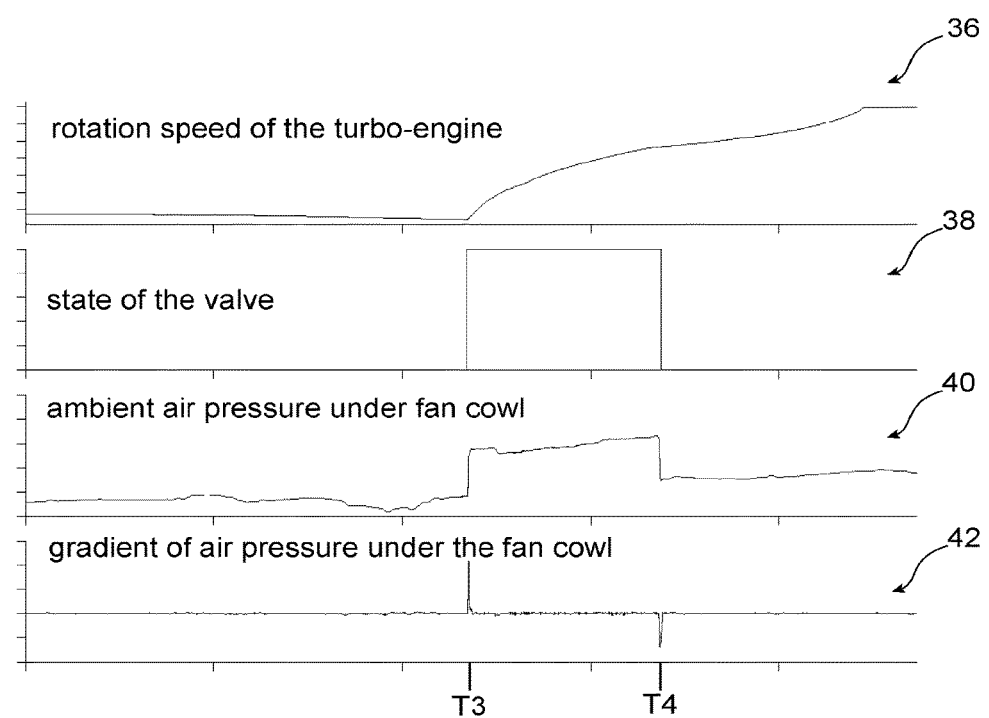
FIG. 4 is a set of curves similar to those in FIG. 3, when the aircraft is in flight.

FIG. 4 shows the curves 36, 38, 40, 42 representing the turbo-engine rotation speed, the closed position or the open position of the valve 18, the air pressure under the fan cowl and the air pressure gradient under the fan cowl respectively, during a restart phase of the turbo-engine 10 in flight.

This restart in flight phase takes place after the turbo-engine 10 has stopped when the aircraft is in flight.

The turbo-engine 10 is driven only by the relative airflow produced by the aircraft displacement, the rotation speed of the turbo-engine 10 is then reduced. It is said that the turbo-engine 10 is in self-rotation.

In the same way as when starting on the ground as shown in FIG. 3, at time T3 corresponding to the beginning of a start up phase of the turbo-engine 10, an open valve command is sent to open valve 18, in other words a change valve state command to change valve 18 from its closed position (value 0 in the second curve 30) to the open position (value 1).

The rotating parts 20 of the turbo-engine 10 are then driven in rotation by the starter 14, such that the speed of the turbo-engine increases gradually as can be seen on curve 36.

When the valve 18 is open, leakage flows particularly in the starter 14 cause an increase in the ambient air pressure under the fan cowl.

As can be seen on the third and fourth curves 40, 42, the pressure under the fan cowl increases significantly at time T3, the pressure gradient is positive and its value is relatively high.

When the turbo-engine 10 is started up, a close valve 18 command is sent at time T4 to change the valve state from the open position (value 1) to the closed position (value 0). The pressurised air then does not drive the turbo-engine 10.

The turbo-engine rotation speed represented by the first curve 36 continues to increase independently of the start up circuit 12 due to the energy produced in the combustion chamber.

Since valve 18 is closed, leakage flows stop and there is no longer any increase in the air pressure under the fan cowl.

The air pressure under the fan cowl reduces significantly as can be seen on curves 40 and 42, the pressure gradient is then negative and its absolute value is relatively high.

A method for monitoring the position of the valve 18 comprises a step to measure the air pressure under the fan cowl before the change state command of valve 18, in other words before the open valve 18 command at times T1 and T3, or before the close valve command at times T2 and T4 to determine if the valve 18 has changed state at times T1, T2, T3, T4.

The monitoring method also comprises a step in which the air pressure under the fan cowl is measured after the change valve state command of valve 18, in other words after the open valve 18 command at times T1 and T3, or after the close valve 18 command at times T2 and T4.

The method also comprises a step consisting of comparing values of the air pressure under the fan cowl before and after the change valve state command to determine if the valve has actually changed state.

According to a first aspect of this step, the comparison of air pressure values under the fan cowl consists of calculating the difference in values of the measured air pressures under the fan cowl.

The method also comprises a step to determine whether or not the valve 18 has changed state, by comparing values of the air pressure under the fan cowl.

If the value of this difference is greater than or equal to a predetermined threshold value, this means that the pressure variation is due to the air leakage flow from the start up circuit 12, and therefore that the valve 18 has changed state.

If the value of this difference is less than the predetermined threshold value, then the valve 18 has not changed state.

Thus, the determination step consists of determining that the valve 18 has changed state if the value of the difference is greater than or equal to the predefined threshold value and determining that the valve has not changed state if the value of the difference is less than the predetermined threshold value.

According to one variant embodiment of the method, the comparison step consists of calculating the pressure gradient represented by the fourth curve 34, 42.

As can be seen in the fourth curve 34, 42, a peak in the pressure gradient corresponds to a large variation in the air pressure under the fan cowl.

Thus, if the absolute value of the pressure gradient is greater than a threshold value, this means that the valve 18 has changed state.

The positive or negative sign of the gradient shows that the valve 18 is open or closed respectively.

The determination step then consists of determining that the valve 18 has changed state when the absolute value of the gradient is greater than or equal to a predefined threshold value.

As mentioned above, two sensors are associated with the valve 18 to monitor whether or not the valve 18 has actually changed state.

If there is a failure in either of the two sensors, the information about the position of valve 18 output by the defective sensor is different from the information output by the other sensor.

In such a case, it is impossible to know with certainty whether or not the valve 18 has actually changed state.

According to another aspect of the invention, the monitoring method is used when the two sensors output different information, as mentioned above.

Thus, this makes it possible to have a confirmation that valve 18 has changed state after the command, despite bad operation of one of the two sensors.

The monitoring method also comprises a step to determine which of the two sensors is defective, such that the information that it outputs is no longer used, and the position of the valve 18 can then be defined with certainty.

According to one variant embodiment of the invention, the monitoring method is used for each change valve state command of valve 18, independently of information output by the sensors, thus providing additional information to confirm or invalidate the state change of the valve 18.

According to another variant embodiment, the state change of the valve 18 is monitored only by the monitoring method according to the invention, by measuring the air pressure under the fan cowl before and after the change valve state command for valve 18.

This makes it possible to not use the two sensors, and consequently to limit turbo-engine production costs.

The position of the valve 18 is then determined as a function of the position of the valve before the change state command and depending on whether or not the valve has actually changed state, as determined using the method described above.

The invention claimed is:

1. A method for monitoring a change in state of a valve in a turbo-engine start up circuit following a command to change the state of said valve comprising:
   measuring a first value of ambient air pressure under a fan cowl of the turbo-engine a first time after said change state command is issued and before said valve receives said change state command;
   measuring a second value of ambient air pressure under the fan cowl at a second time after said valve receives said change state command;
   comparing the first value of the ambient air pressure under the fan cowl measured at said first time with the second value of the ambient air pressure under the fan cowl measured at said second time; and
   determining whether or not the valve has actually changed state based on a difference between the first value of the ambient air pressure under the fan cowl and the second value of the ambient air pressure under the fan cowl,
   wherein the valve is determined to have actually changed state when the difference is greater than or equal to a predetermined threshold value.

2. The method according to claim 1, wherein said determining includes determining that the valve is open after said change valve state command when the second value of ambient air pressure under the fan cowl is greater than the first value of ambient air pressure under the fan cowl.

3. The method according to claim 1, wherein said determining includes determining that the valve is closed following said change valve state command when the second value of ambient air pressure under the fan cowl is less than the first value of ambient air pressure under the fan cowl.

4. The method according to claim 1, wherein said determining includes calculating an air pressure gradient under the fan cowl when said change valve state command is given.

5. The method according to claim 4, wherein said determining includes determining that the valve has changed state when an absolute value of said air pressure gradient is greater than a predetermined air pressure gradient threshold value.

6. The method according to claim 1, wherein the start up circuit comprises first and second position sensors to determine if the valve is open or closed, and wherein said measuring, comparing, and determining are performed when an information about the state of valve output by the first position sensor is different from an information output by the second position sensor.

7. The method according to claim 6, further comprising determining which of the first and second position sensors is defective.

8. An aircraft turbo-engine comprising:
   a start up circuit, said start up circuit comprising a pneumatic starter and a starter pressurized air supply valve;
   means for measuring a first value of ambient air pressure under a fan cowl of the turbo-engine at a first time after a change state command of the pressurized air supply valve is issued and before the pressurized air supply valve receives the change state command;
   means for measuring a second value of ambient air pressure under the fan cowl at a second time after the pressurized air supply valve receives said change state command;
   means for comparing the first value of the ambient air pressure under the fan cowl measured at the first time with the second value of the ambient air pressure measured at the second time; and means for determining whether or not the valve has actually changed state based on a difference between the first value of the ambient air pressure under the fan cowl and the second value of the ambient air pressure under the fan cowl, wherein the means for determining determines that the valve to have actually changed state when the difference is greater than or equal to a predetermined threshold value.

9. A method for monitoring a change in state of a valve in a turbo-engine start up circuit following a command to change the state of said valve comprising:

measuring a first value of ambient air pressure under a fan cowl of the turbo-engine before said change state command at a first time;

measuring a second value of ambient air pressure under the fan cowl after said change state command at a second time;

comparing the first value of the ambient air pressure under the fan cowl measured before the change state command with the second value of the ambient air pressure under the fan cowl measured after the change state command; and determining whether or not the valve has actually changed state based on a difference between the first value of the ambient air pressure under the fan cowl and the second value of the ambient air pressure under the fan cowl, wherein the valve is determined to have actually changed state when the difference is greater than or equal to a predetermined threshold value, and wherein the start up circuit comprises first and second position sensors to determine if the valve is open or closed, and wherein said measuring, comparing, and determining are performed when an information about the state of valve output by the first position sensor is different from an information output by the second position sensor.

* * * * *